United States Patent
Qian et al.

(10) Patent No.: US 11,213,049 B2
(45) Date of Patent: Jan. 4, 2022

(54) METHOD FOR REDUCING THE PURINE CONTENT OF SOYBEAN MILK

(71) Applicant: Jiangnan University, Wuxi (CN)

(72) Inventors: He Qian, Wuxi (CN); Yuliang Cheng, Wuxi (CN); Yuejia Li, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 168 days.

(21) Appl. No.: 16/398,008

(22) Filed: Apr. 29, 2019

(65) Prior Publication Data

US 2019/0254310 A1  Aug. 22, 2019

Related U.S. Application Data

(63) Continuation of application No. PCT/CN2018/095762, filed on Jul. 16, 2018.

(30) Foreign Application Priority Data

Nov. 30, 2017  (CN) .......................... 2017112409126

(51) Int. Cl.
  *A23J 3/16* (2006.01)
  *A23J 3/34* (2006.01)
  *A23C 11/10* (2021.01)

(52) U.S. Cl.
  CPC ............. *A23J 3/346* (2013.01); *A23C 11/103* (2013.01); *A23V 2002/00* (2013.01); *A23V 2300/02* (2013.01); *A23V 2300/12* (2013.01); *A23V 2300/28* (2013.01)

(58) Field of Classification Search
  CPC .......... A23V 2002/00; A23V 2250/548; A23V 2300/02; A23V 2300/12; A23V 2300/28; A23L 33/185; A23L 11/00; A23C 11/103; A23C 2240/15; A23C 11/06; A23C 9/1203; A23J 3/16; A23J 3/14; A23J 3/346; A23J 1/14; A23J 3/34; A23J 1/146; A23J 3/30
  See application file for complete search history.

(56) References Cited

U.S. PATENT DOCUMENTS

2011/0091603 A1 * 4/2011 Chen .................... A23L 5/28
                                                                  426/46

FOREIGN PATENT DOCUMENTS

JP   2001275599 A  * 10/2001

OTHER PUBLICATIONS

JP 2001275599-A, Machine Translation, Takaharu et al. Oct. 2001 (Year: 2001).*

* cited by examiner

*Primary Examiner* — Hong T Yoo
(74) *Attorney, Agent, or Firm* — IPro, PLLC; Na Xu

(57) ABSTRACT

The present disclosure disclosed is a method for reducing the purine content of soybean milk, which belongs to the technical field of food depurination. According to the method, purine-reducing soybeans are taken as raw materials, and macromolecular purine in a bound state is selected to be hydrolyzed into small molecules according to different existence forms of purine in soybeans, and then micromolecular purine is adsorbed and removed by an adsorbent. The method is high in feasibility and good in removal effect. The soybean milk of the present disclosure is safe and non-toxic, high in purine removal rate, and low in nutrient loss, has no obvious change in mouth feel compared with common soybean milk, and can be used as a safe food for gout patients.

9 Claims, No Drawings

METHOD FOR REDUCING THE PURINE CONTENT OF SOYBEAN MILK

TECHNICAL FIELD

The disclosure herein relates to the field of food depurination, relating to a method for reducing the purine content of soybean milk.

BACKGROUND

Soybean milk is a traditional drink which is loved by Chinese people and also a nutritious vegetable drink. The soybean milk, rich in vegetable protein, phospholipids, vitamins and minerals, has long been used as the food of choice for breakfast, and has been developed into a variety of soybean milk drinks, such as soy milk, jujube soybean milk and black sesame soybean milk. The traditional soybean milk preparation method includes: soaking soybeans in water for 10-12 hours, boiling the water, grinding the soybeans, and filtering residues with gauze to obtain finished soybean milk. Although soybean milk is rich in nutrients and unique in taste, the soybean milk processed by the existing method still retains a high purine content and is not suitable for gout patients. In order to improve the quality of life of gout patients, how to remove purine in soybean milk has become a topic worth exploring.

At present, in order to solve the problem of difficulty in removing purine from soybean milk, the main methods in the domestic solution include physical salting out and adsorption. Most of the physical methods may remove free purine. For bound purine with a larger molecular weight, such as nucleic acid materials, the removal efficiency is limited, and the addition of salt easily causes the change in the mouth feel of soybean milk. In the present disclosure, a chemical method is used. A certain amount of exonuclease is added to soybean milk, purine in a bound state is hydrolyzed into purine in a free state, and then micromolecular purine in the free state is adsorbed by using an adsorbent, so that the purine content of the soybean milk is greatly reduced, and low-purine soybean milk is finally obtained.

SUMMARY

In order to solve the existing problem of high purine content of soybean milk, the present disclosure provides a method for reducing the purine content of soybean milk.

A first objective of the present disclosure is to provide a method for reducing the purine content of soybean milk. The method includes: preparing soybean milk from purine-reducing soybeans which are used as raw materials, adding exonuclease to the soybean milk for enzymatic hydrolysis, and then adsorbing by using an adsorbent.

In one embodiment of the present disclosure, the purine-reducing soybeans are prepared by using the following method: adding soybeans to an aqueous solution of calcium chloride having a concentration of 1-3% at a mass-to-volume ratio (g/mL) of 1:5-1:10 for stirring and soaking, wherein the soaking temperature is 50-70° C., and the soaking time is 2-4 h; and washing the soaked soybeans with water to remove calcium chloride from surfaces, then putting into a high-voltage electric field pulse generator, performing treatment with a pulse electric field of 15-30 kv/cm, a pulse number of 15-25 times and a pulse width of 2-6 µs, and cleaning to obtain a purine-reducing soybean product.

In one embodiment of the present disclosure, the exonuclease is added in an amount of 1% to 2% (m/v, mL:mg) of the soybean milk.

In one embodiment of the present disclosure, the exonuclease has a hydrolysis temperature of 40-60° C., a reaction pH of 5-7, and a hydrolysis time of 2-4 h.

In one embodiment of the present disclosure, the adsorbent is activated carbon, chitosan or a molecular sieve.

In one embodiment of the present disclosure, the adsorbent is added in a ratio of 2% to 4% (m/v, mL:mg), and a treatment time is 1 to 2 h.

In one embodiment of the present disclosure, the soybean milk is prepared by using the following method: putting the purine-reducing soybeans into a stirrer at a bean-to-water ratio of 1:4-8, stirring at a low speed for 1 to 2 minutes, adding an appropriate amount (0.01~0.10 wt %) of defoaming agent (such as $NaHCO_3$), stirring at a medium speed for 1 to 2 minutes, and then grinding for 2 to 5 times by a colloid grinder to obtain soybean milk.

A second objective of the present disclosure is to provide a soybean milk drink prepared by using the method.

A third objective of the present disclosure is to provide use of the method in preparation of a purine-reducing drink.

Beneficial Effects of the Disclosure:

(1) According to the method, purine-reducing soybeans are taken as raw materials, and macromolecular purine in a bound state is selected to be hydrolyzed into small molecules according to different existence forms of purine in soybeans, and then micromolecular purine is adsorbed and removed by an adsorbent. The method is high in feasibility and good in removal effect.

(2) The soybean milk of the present disclosure is safe and non-toxic, high in purine removal rate, and low in nutrient loss, has no obvious change in mouth feel compared with common soybean milk, and can be used as a safe food for gout patients.

DETAILED DESCRIPTION

Purine Content Determination Method:

10 mL of soybean milk was put into a colorimetric tube with a stopper, 10 mL of perchloric acid was added, the soybean milk was hydrolyzed at 100° C. for 60 min and then rapidly cooled in an ice bath, the pH of a NaOH solution was adjusted to neutral and then adjusted to 4.0 with a dilute phosphoric acid, a precipitate was filtered off with a filter paper, a filtrate was adjusted to a volume of 30 mL, an appropriate amount of the filtrate was treated by a microporous membrane, and then the content was determined by high performance liquid chromatography.

Example 1

Firstly, purine-reducing soybeans were prepared. Soybeans were added to an aqueous solution of calcium chloride having a concentration of 3% at a mass-to-volume ratio of 1:5 for stirring and soaking, where a soaking temperature was 50° C., and a soaking time was 2 h; and the soaked soybeans were washed with water to remove calcium chloride from surfaces, put into a high-voltage electric field pulse generator, treated with a pulse electric field of 15 kv/cm, a pulse number of 20 times and a pulse width of 4 µs, and then cleaned to obtain a purine-reducing soybean product.

Then, the foregoing soybeans were put into a stirrer at a bean-to-water ratio of 1:6, stirred at a low speed for 1 minute, stirred at a medium speed for 1 minute after 0.05%

(g/g) defoaming agent NaHCO$_3$ was added, and then ground for 3 times by a colloid grinder to obtain soybean milk.

Finally, exonuclease was added to the foregoing soybean milk for enzymatic hydrolysis according to the following conditions: the exonuclease was added in an amount of 50:1 (mL:mg), a hydrolysis temperature was 60° C., the pH was 5, and a hydrolysis time was 4 h. At this time, most of bound purine was converted into free purine. Activated carbon was added to the hydrolyzed soybean milk at a ratio of 50:1 (mL:mg), and the mixture was centrifuged after constant-temperature standing for 1 h, so as to obtain soybean milk having a low purine content. The method removes 83.72% of purine in soybean milk compared to soybean milk obtained without any treatment.

Example 2

Firstly, purine-reducing soybeans were prepared. Soybeans were added to an aqueous solution of calcium chloride having a concentration of 1% at a mass-to-volume ratio of 1:10 for stirring and soaking, where a soaking temperature was 70° C., and a soaking time was 4 h; and the soaked soybeans were washed with water to remove calcium chloride from surfaces, put into a high-voltage electric field pulse generator, treated with a pulse electric field of 30 kv/cm, a pulse number of 25 times and a pulse width of 6 μs, and then cleaned to obtain a purine-reducing soybean product.

Then, the foregoing soybeans were put into a stirrer at a bean-to-water ratio of 1:6, stirred at a low speed for 1 minute, stirred at a medium speed for 1 minute after 0.05% (g/g) defoaming agent NaHCO$_3$ was added, and then ground for 3 times by a colloid grinder to obtain soybean milk.

Finally, exonuclease was added to the foregoing soybean milk for enzymatic hydrolysis according to the following conditions: the exonuclease was added in an amount of 50:1 (mL:mg), a hydrolysis temperature was 40° C., the pH was 7, and a hydrolysis time was 4 h. At this time, most of bound purine was converted into free purine. Activated carbon was added to the hydrolyzed soybean milk at a ratio of 50:1 (mL:mg), and the mixture was centrifuged after constant-temperature standing for 2 h, so as to obtain soybean milk having a low purine content. The method removes 87.09% of purine in soybean milk compared to soybean milk obtained without any treatment.

Example 3

Firstly, purine-reducing soybeans were prepared. Soybeans were added to an aqueous solution of calcium chloride having a concentration of 1% at a mass-to-volume ratio of 1:10 for stirring and soaking, where a soaking temperature was 60° C., and a soaking time was 3 h; and the soaked soybeans were washed with water to remove calcium chloride from surfaces, put into a high-voltage electric field pulse generator, treated with a pulse electric field of 30 kv/cm, a pulse number of 15 times and a pulse width of 6 μs, and then cleaned to obtain a purine-reducing soybean product.

Then, the foregoing soybeans were put into a stirrer at a bean-to-water ratio of 1:6, stirred at a low speed for 1 minute, stirred at a medium speed for 1 minute after 0.05% (g/g) defoaming agent NaHCO$_3$ was added, and then ground for 3 times by a colloid grinder to obtain soybean milk.

Finally, exonuclease was added to the foregoing soybean milk for enzymatic hydrolysis according to the following conditions: the exonuclease was added in an amount of 100:1 (mL:mg), a hydrolysis temperature was 60° C., the pH was 7, and a hydrolysis time was 2 h. At this time, most of bound purine was converted into free purine. Activated carbon was added to the hydrolyzed soybean milk at a ratio of 50:1 (mL:mg), and the mixture was centrifuged after constant-temperature standing for 1 h, so as to obtain soybean milk having a low purine content. The method removes 85.66% of purine in soybean milk compared to soybean milk obtained without any treatment.

Example 4

Firstly, purine-reducing soybeans were prepared. Soybeans were added to an aqueous solution of calcium chloride having a concentration of 3% at a mass-to-volume ratio of 1:5 for stirring and soaking, where a soaking temperature was 70° C., and a soaking time was 3 h; and the soaked soybeans were washed with water to remove calcium chloride from surfaces, put into a high-voltage electric field pulse generator, treated with a pulse electric field of 30 kv/cm, a pulse number of 25 times and a pulse width of 6 μs, and then cleaned to obtain a purine-reducing soybean product.

Then, the foregoing soybeans were put into a stirrer at a bean-to-water ratio of 1:6, stirred at a low speed for 1 minute, stirred at a medium speed for 1 minute after 0.05% (g/g) defoaming agent NaHCO$_3$ was added, and then ground for 3 times by a colloid grinder to obtain soybean milk.

Finally, exonuclease was added to the foregoing soybean milk for enzymatic hydrolysis according to the following conditions: the exonuclease was added in an amount of 50:1 (mL:mg), a hydrolysis temperature was 50° C., the pH was 6, and a hydrolysis time was 4 h. At this time, most of bound purine was converted into free purine. Activated carbon was added to the hydrolyzed soybean milk at a ratio of 50:1 (mL:mg), and the mixture was centrifuged after constant-temperature standing for 2 h, so as to obtain soybean milk having a low purine content. The method removes 91.38% of purine in soybean milk compared to soybean milk obtained without any treatment.

Example 5

Firstly, purine-reducing soybeans were prepared. Soybeans were added to an aqueous solution of calcium chloride having a concentration of 3% at a mass-to-volume ratio of 1:5 for stirring and soaking, where a soaking temperature was 70° C., and a soaking time was 3 h; and the soaked soybeans were washed with water to remove calcium chloride from surfaces, put into a high-voltage electric field pulse generator, treated with a pulse electric field of 20 kv/cm, a pulse number of 20 times and a pulse width of 4 μs, and then cleaned to obtain a purine-reducing soybean product.

Then, the foregoing soybeans were put into a stirrer at a bean-to-water ratio of 1:6, stirred at a low speed for 1 minute, stirred at a medium speed for 1 minute after 0.05% (g/g) defoaming agent NaHCO$_3$ was added, and then ground for 3 times by a colloid grinder to obtain soybean milk.

Finally, exonuclease was added to the foregoing soybean milk for enzymatic hydrolysis according to the following conditions: the exonuclease was added in an amount of 50:1 (mL:mg), a hydrolysis temperature was 50° C., the pH was 5, and a hydrolysis time was 3 h. At this time, most of bound purine was converted into free purine. Activated carbon was added to the hydrolyzed soybean milk at a ratio of 50:1 (mL:mg), and the mixture was centrifuged after constant-temperature standing for 2 h, so as to obtain soybean milk having a low purine content. The method removes 94.27% of purine in soybean milk compared to soybean milk obtained without any treatment.

Example 6

Firstly, purine-reducing soybeans were prepared. Soybeans were added to an aqueous solution of calcium chloride having a concentration of 2% at a mass-to-volume ratio of 1:10 for stirring and soaking, where a soaking temperature was 70° C., and a soaking time was 2 h; and the soaked soybeans were washed with water to remove calcium chloride from surfaces, put into a high-voltage electric field pulse generator, treated with a pulse electric field of 25 kv/cm, a pulse number of 15 times and a pulse width of 6 μs, and then cleaned to obtain a purine-reducing soybean product.

Then, the foregoing soybeans were put into a stirrer at a bean-to-water ratio of 1:6, stirred at a low speed for 1 minute, stirred at a medium speed for 1 minute after 0.05% (g/g) defoaming agent NaHCO$_3$ was added, and then ground for 3 times by a colloid grinder to obtain soybean milk.

Finally, exonuclease was added to the foregoing soybean milk for enzymatic hydrolysis according to the following conditions: the exonuclease was added in an amount of 100:1 (mL:mg), a hydrolysis temperature was 60° C., the pH was 7, and a hydrolysis time was 4 h. At this time, most of bound purine was converted into free purine. Activated carbon was added to the hydrolyzed soybean milk at a ratio of 50:1 (mL:mg), and the mixture was centrifuged after constant-temperature standing for 2 h, so as to obtain soybean milk having a low purine content. The method removes 90.82% of purine in soybean milk compared to soybean milk obtained without any treatment.

Comparative Example 1

First, soybeans not treated with purine reduction was soaked for 10 h, put into a stirrer at a bean-to-water ratio of 1:6, stirred at a low speed for 1 minute, stirred at a medium speed for 1 minute after 0.05% (g/g) defoaming agent NaHCO$_3$ was added, and then ground for 3 times by a colloid grinder to obtain soybean milk.

Then, exonuclease was added to the foregoing soybean milk for enzymatic hydrolysis according to the following conditions: the exonuclease was added in an amount of 100:1 (mL:mg), a hydrolysis temperature was 60° C., the pH was 7, and a hydrolysis time was 4 h. Activated carbon was added to the hydrolyzed soybean milk at a ratio of 50:1 (mL:mg), and the mixture was centrifuged after constant-temperature standing for 2 h, so as to obtain soybean milk having a low purine content. The method removes 43.65% of purine in soybean milk compared to soybean milk obtained without any treatment.

Comparative Example 2

Endonuclease was used as hydrolase. Firstly, purine-reducing soybeans were prepared. Soybeans were added to an aqueous solution of calcium chloride having a concentration of 2% at a mass-to-volume ratio of 1:10 for stirring and soaking, where a soaking temperature was 70° C., and a soaking time was 2 h; and the soaked soybeans were washed with water to remove calcium chloride from surfaces, put into a high-voltage electric field pulse generator, treated with a pulse electric field of 25 kv/cm, a pulse number of 15 times and a pulse width of 6 μs, and then cleaned to obtain a purine-reducing soybean product.

Then, the foregoing soybeans were put into a stirrer at a bean-to-water ratio of 1:6, stirred at a low speed for 1 minute, stirred at a medium speed for 1 minute after 0.05% (g/g) defoaming agent NaHCO$_3$ was added, and then ground for 3 times by a colloid grinder to obtain soybean milk.

Finally, endonuclease was added to the foregoing soybean milk for enzymatic hydrolysis according to the following conditions: the endonuclease was added in an amount of 100:1 (mL:mg), a hydrolysis temperature was 60° C., the pH was 7, and a hydrolysis time was 4 h. Activated carbon was added to the hydrolyzed soybean milk at a ratio of 50:1 (mL:mg), and the mixture was centrifuged after constant-temperature standing for 2 h, so as to obtain soybean milk having a low purine content. The method only removes 66.48% of purine in soybean milk compared to soybean milk obtained without any treatment. The endonuclease is not suitable for the hydrolysis of soybean milk nucleic acids.

What is claimed is:

1. A method for reducing purine content in soybean milk, comprising:
    adding soybeans to an aqueous solution of calcium chloride having a concentration of 1% to 3% and at a mass-to-volume ratio of 1:5 to 1:10, followed by stirring and soaking the soybeans, wherein soaking is performed at a temperature of 50° C. to 70° C., and for 2 hours to 4 hours, to provide soaked soybeans; and
    washing the soaked soybeans with water to remove the calcium chloride from surface of the soaked soybeans,
    placing the soaked soybeans into a high-voltage electric field pulse generator, and pulsing the soaked soybeans with a pulse electric field of 15 kv/cm to 30 kv/cm, a pulse number of 15 to 25 times, and a pulse width of 2 μs to 6 μs to thereby obtain pulsed soybeans, and
    cleaning the pulsed soybeans to obtain a soybean milk,
    adding exonuclease in an amount of 1% to 2% (m/v) of the soybean milk, and
    adding an adsorbent, thereby obtaining soybean milk with reduced purine content.

2. The method according to claim 1, wherein the adsorbent is activated carbon, chitosan or a molecular sieve.

3. A method comprising:
    preparing soybean milk from soybeans,
    adding exonuclease to soybean milk, and
    adding activated carbon as an adsorbent to the soybean milk.

4. The method according to claim 3, wherein the soybean milk is prepared by:
    adding soybeans to an aqueous solution of calcium chloride having a concentration of 1% to 3% at a mass-to-volume ratio of 1:5 to 1:10, followed by stirring and soaking, wherein soaking is performed at a temperature of from 50° C. to 70° C., and for 2 hours to 4 hours, to provide soaked soybeans; and
    washing the soaked soybeans with water to remove the calcium chloride from the surface of the soaked soybeans,
    placing the soaked soybeans into a high-voltage electric field pulse generator, and pulsing the soaked soybeans with a pulse electric field of 15 kv/cm to 30 kv/cm, a pulse number of 15 to 25 times, and a pulse width of 2 μs to 6 μs, and
    cleaning.

5. The method according to claim 3, wherein the exonuclease is added in an amount of 1% to 2% (m/v) of the soybean milk.

6. The method according to claim 3, wherein after the exonuclease is added, hydrolysis is performed at a temperature of 40° C. to 60° C., a reaction pH 5 to 7, and a hydrolysis time of 2 hours to 4 hours.

7. The method according to claim 3, wherein the adsorbent is added in a ratio of 2% to 4% (m/v), and treatment time is 1 hour to 2 hours.

8. The method according to claim 3, wherein the soybean milk is prepared by using the following method:
stirring the soybeans for 1 to 2 minutes,
adding defoaming agent,
stirring the soybeans for an additional 1 to 2 minutes, and
grinding the soybeans 2 to 5 times with a colloid grinder.

9. The method according to claim 3, further comprising adding the purine-reduced soybean milk product into other drinks.

* * * * *